United States Patent [19]

Farello et al.

[11] Patent Number: 5,059,386
[45] Date of Patent: Oct. 22, 1991

[54] MECHANISM FOR THE AUTOMATIC RELEASE OF CONTROL BARS IN A NUCLEAR REACTOR

[75] Inventors: Giovanni E. Farello; Antonio Naviglio, both of Rome, Italy

[73] Assignee: Comitato Nazionale per la Ricerca e per lo Sviluppo Dell'Energia Nucleare e Delle Energie Alternative, Rome, Italy

[21] Appl. No.: 508,640

[22] Filed: Apr. 13, 1990

[30] Foreign Application Priority Data

Apr. 13, 1989 [IT] Italy ................................ 47844 A/89

[51] Int. Cl.⁵ ............................................. G21C 7/12
[52] U.S. Cl. ..................................... 376/336; 376/233
[58] Field of Search ............... 376/327, 336, 337, 233, 376/212, 213

[56] References Cited

U.S. PATENT DOCUMENTS

| | | | |
|---|---|---|---|
| 3,546,996 | 12/1970 | Grijalva | 376/336 |
| 3,976,543 | 8/1976 | Sowa | 376/336 |
| 3,992,257 | 11/1976 | Erp et al. | 376/336 |
| 4,204,909 | 5/1980 | Giuggio et al. | 376/336 |
| 4,227,967 | 10/1980 | Zebroski | 376/327 |
| 4,587,085 | 5/1986 | Hutter | 376/336 |
| 4,654,192 | 3/1987 | Hutter et al. | 376/336 |
| 4,713,210 | 12/1987 | Germer | 376/336 |
| 4,762,662 | 8/1988 | Harty et al. | 376/336 |
| 4,889,683 | 12/1989 | Ford et al. | 376/336 |
| 4,943,409 | 7/1990 | Broadley | 376/212 |

Primary Examiner—Harvey E. Behrend
Attorney, Agent, or Firm—Browdy and Neimark

[57] ABSTRACT

A mechanism for automatically releasing the control bars in a nuclear reactor following an increase of the temperature in the nuclear boiler includes a thermal sensor suitable for producing a mechanical force or a torque as a function of the temperature and such as to operate a mechanical actuator which provides to unlock the device that holds said control bars causing in this way their fall under the force of gravity.

4 Claims, 3 Drawing Sheets

MECHANISM FOR THE AUTOMATIC RELEASE OF CONTROL BARS IN A NUCLEAR REACTOR

In nuclear reactors of the pressurized water kind, the shutdown of the nuclear boiler (reactor) is performed in circumstances of emergency, by means of the fall under the force of gravity of the control bars; said bars being constituted of materials that strongly absorb neutrons, in order to stop the nuclear reaction.

The need of nuclear reactors having a greater passive safety, in which the shutdown of the nuclear reaction is assured by physical mechanisms having an absolute safety, has become pressing after some well-known incidents in nuclear plants, in particular the most recent in Chernobyl, owing to the worry that some devices in the present complex systems for the shutdown of the nuclear reactions fail to operate.

According to the present state of the art, the control bars are released in front of a request of shutdown of the chain reaction, by means of electromechanical servo-mechanisms created to control chains that include a complex instrumentation; this is also made necessary by the plurality of conditions of the plant and the physical parameters that may require such shutdown.

Being this electromechanical chains accurately designed but complex, the worries arise from the possible unreliability of the same chains in respect of consents and actions owing to defects in strategic points of the chains themselves.

The aim of the present invention is to avoid, for the release of the control bars, the dependence on complex electromechanical actuation chains, with a consequent dependence on electric power supply, providing a purely mechanical mechanism, which is extremely simple, that has an exceptional reliability in its operation, and that does not require any electrical power supply, directly responsive to the temperature of the cooling liquid, and operated as a function of said temperature, capable of developing autonomously the force necessary for the release of said control bars at the very first increase or the temperature in the nuclear boiler and moreover independent from the presence of technical personnel in the control room.

The mechanism according to the invention is conceived for assuring the shutdown of the nuclear reactor in the presence also of moderate temperature increases detected in the immediate proximity of the fuel bars, that is in the core, the area most near to the point where the heat is generated.

The mechanism according to the present invention comprises essentially: a thermal sensor capable of producing a mechanical force or a mechanical torque in an autonomous way, owing to its physical-mechanical features, as a function of the absolute temperature of the fluid contacting the nuclear fuel (differently from the thermocouples, that need, for instance, a reference without which the temperature cannot be determined), the above mentioned force being developed as a consequence of the thermal state and is consequently of a passive kind and not bound to the availability of external sources of supply power, the sensor is located at the interior of the fuel element in a cell where usually the instrumentation is located in a place of a fuel bar; a mechanical actuator for the release of the bars realized in order to unlock the device that holds the bundle of control bars causing in this way their fall under the force of gravity following an actuation by said thermal sensor, the actuator may have a symmetrical structure for better supporting the weight of the control bars, the structure of which is generally a symmetrical one; a possible element for the mechanical transmission of the force or of the torque developed in the sensor, such element being necessary only in those cases in which the actuator of the release is positioned far away from the thermal sensor which generates a force. When it is present, the transmission element is realized with metal bars connected with the sensor so that the produced force or torque is transferred in the area where the release is performed.

The present invention will be now better understood from the description of a preferred embodiment thereof, referred to as a non-limitative example, and with reference to the attached drawing, wherein.

Figure 1:
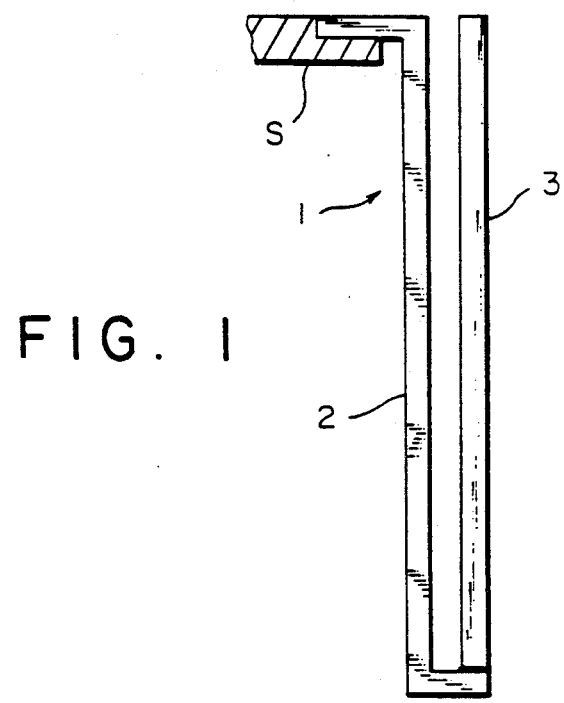
FIG. 1 is a schematical view of an example of thermal sensor for the mechanism in question, in the non-operative condition.
Figure 2:
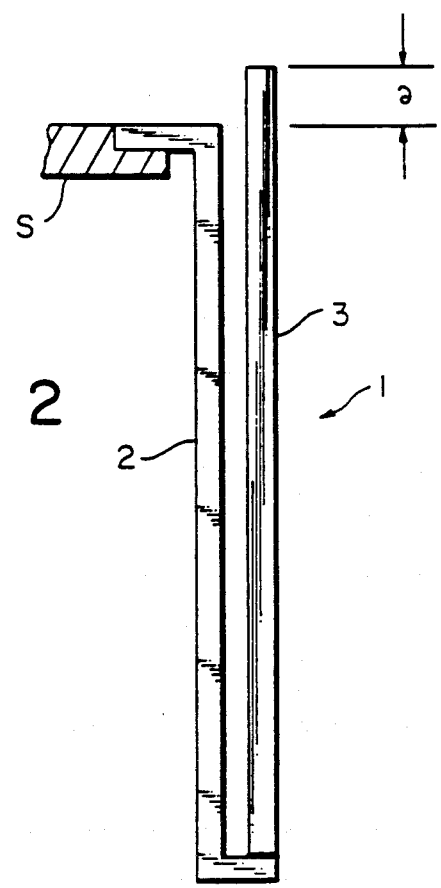
FIG. 2 is a view of the thermal sensor of FIG. 1 in the operating state.

With reference to FIGS. 1 and 2, there is shown, in the non-operative state and in the operative state, respectively, the thermal sensor, generally shown in 1 of the mechanism according to the present invention realized as a bimetal pair of the kind that entails the development of an axial force as a function of temperature.

The thermal sensor 1 comprises a first bar 2 the upper end of which is fastened to a rigid structure S while the opposed lower end is fastened to the lower end of a second bar 3, spaced from and parallel to the first one, the upper end of which is free.

The first and the second bars 2, 3 are realized with materials having different coefficient of thermal expansion, and in particular, the coefficient of thermal expansion of the second bar 3 is substantially greater than that of the first bar 2, and as a consequence, following a variation of the temperature, different elongation will occur in the two abovesaid bars, and more precisely, the elongation of the second bar 3 will be greater than that of the first bar 2, as it can be appreciated from FIG. 2.

The relative elongation of the second bar 3 that intrinsecally can not be prevented or suppressed, will produce an axial force which is utilized, according to the present invention for performing automatically, in the event of an increase of the temperature of the cooling fluid, the release of the control bars in the way that will be better explained hereinafter.

Figure 3:
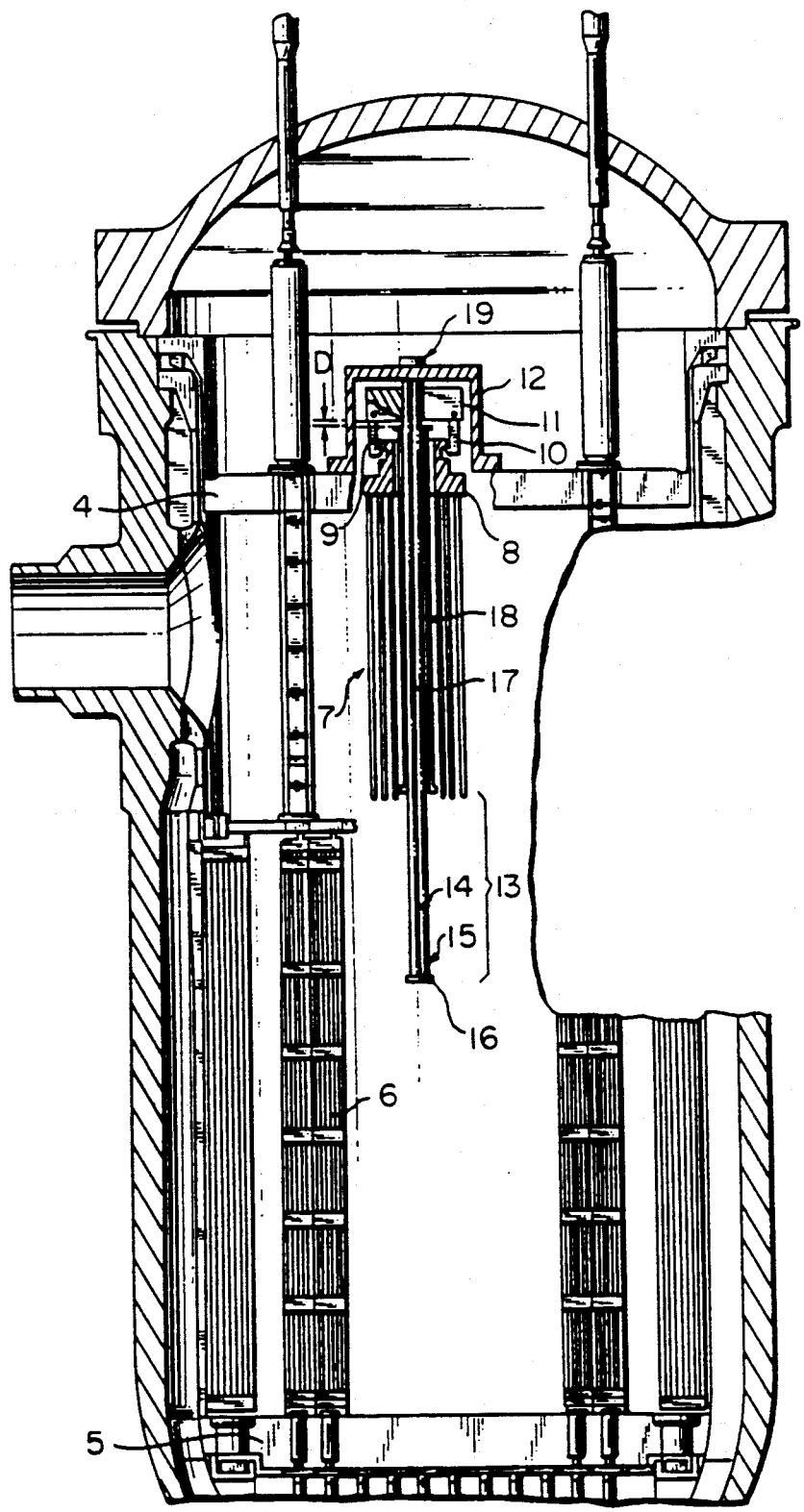
FIG. 3 is a sectional schematical view with taken-away parts, of a nuclear reactor wherein the mechanism in question is mounted.

Passing to study FIG. 3, wherein the mechanism according to the invention is shown schematically and mounted at the interior of the nuclear reactor, there are shown in 4 and 5, respectively, the upper and lower plates of the core of the nuclear reactor, in 6 the fuel elements, in 7 a bundle of control bars fastened to a upper support plate 8.

From opposite sides of the support plate 8 there protrude in the upper part of the same two brackets 9 with which there are engaged respective hooks 10 that, in this way, support the bundle of control bars 7 in an "extracted" position, said hooks 10 being associated to a mechanical actuator 11 that will be better described hereinafter, supported by a rigid structure 12 fastened to the upper plate 4 of the reactor.

In the figure in question, there is shown generally in 13 the thermal sensor, already shown schematically and disclosed with reference to FIGS. 1 and 2, and constituted in this case by two bars 14 and 15 having a cylindrical symmetry, and concentrical, of which the one shown in 15 is realized with a material having a coefficient of thermal expansion greater than that of the material with which the bar 14 is constituted, rigidly coupled in correspondence with their lower ends by means of a connection member 16.

The upper ends of the bars 14 and 15 are fastened to the lower ends of respective transmission rods 17 and 18, made of a material either responsive or not to thermal variations, of which the first one has the upper end locked in 19 to the rigid structure 12, fastened, as above said, to the upper plate 4 of the reactor, while the second one extends up to area of the actuator 11 at a distance D from this latter, constituting the play or dead space existing when the thermal sensor 13 is in the non-operative condition.

The distance D may be adjusted as a function of the temperature for which the release is sought.

It is to be stated immediately, that the transmission rods 17 and 18 may be omitted, and in this case the bars 14 and 15 of the sensor 13 will extend respectively up to the above mentioned respective positions of the upper ends of the rods 16 and 17.

Figure 4:
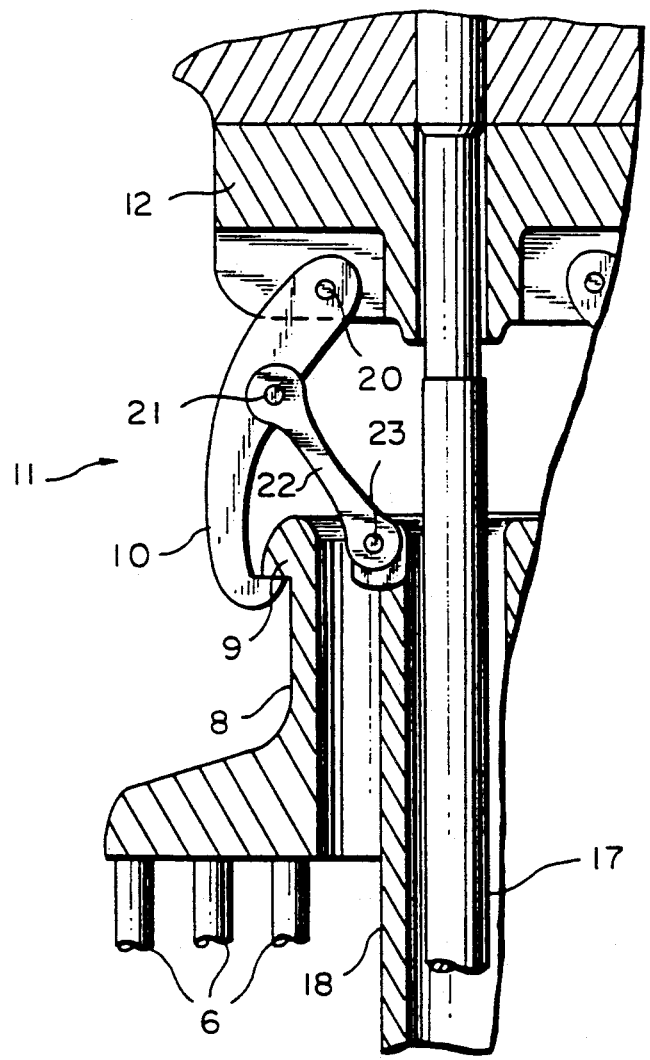
FIG. 4 is a detailed view that shows an example of a mechanical actuator for the release of the control bars.

In FIG. 4 there is shown an example of structural arrangement of a system for holding the bundle of control bars in the suspended, extracted condition, as well as of a mechanical actuator for releasing said bars allowing their fall under the force of gravity following the actuation by the thermal sensor when the same owing to the increase of temperature of the cooling fluid, passes into the actuated condition.

Said system for holding the bundle of bars 7 in the suspended condition comprises two hooks 10, symmetrical with respect to the axis of the bundle of control bars 7, of which only one is shown in the figure, in register with respective opposite sides of the support plate 8 of the bundle of control bars 7, suitable for engagement with respective brackets 9 protruding above from the plate 8, for supporting said control bars in said extracted position. Each of said hooks 10 has the end opposite to the one in engagement with the respective bracket 9 of the plate 8, pivoted in 20 onto the rigid structure 12 which is part of the reactor and in an intermediate position is rotatably connected by means of the pin 21 to an end of a swinging lever 22, that constitutes in this case said actuator, the opposite end of which is connected rotatably by means of the pin 23 to the upper end of the tubular transmission rod 18 that, being concentrical as above said externally with respect to the rod 17, has the lower end fastened to the upper end of the bar 15 having a coefficient of thermal expansion greater than that of the bar 14 of the thermal sensor 13.

In the operation, with the thermal sensor 13 introduced in the interior of the fuel element 6 in a central position where instrumentation components are located, when the temperature increases beyond a predetermined limit, the bar 15 of the thermal sensor 13, owing to such temperature increase, will undergo, as above explained, an elongation which causes an elevation of the transmission rod 18 and the operation of the actuator 11 entailing the counterclockwise rotation of the articulated levers 22 around the pins 23 that connect them to the transmission rod 18 (see FIG. 4) and consequently the clockwise rotation of the respective hooks 10 around the pins 20 moving away from the engagement with the respective brackets 9 on the plate 8 releasing in this way the latter and allowing consequently the fall of the control bars 7 under the action of the force of gravity.

As an alternative, it should be stated here that, contrary to what has been said before, while maintaining the arrangement shown in FIG. 3, the thermal sensor 13 may have the internal bar 14 realized with a material having a coefficient of thermal expansion greater than that of the material of the external bar 15, in such case the operation of the actuator 11, when the temperature increases above the predetermined limit, will not occur following the lifting of the bar 18 fastened to the bar 15, but following the pulling downwards of the same following the elongation in said direction of the bar 14, the lower end of which is fastened, as above said, to the corresponding end of the bar 15.

With the thermal sensor 13 built as above described, the structure of the actuator 11 will have obviously, to be modified and, in particular, in the example of FIG. 4, the linkage referred to, the members 10, 18, 20, 21, 22, 23 will have to be suitably modified so that the pulling downwards of the rod 18 will result in a disengagement of the hook 10 from the bracket 9 of the support plate 8 of the bundle of control bars 7.

From the above, one may appreciate the noteworthy advantage below referred to of the mechanism of the invention with respect to the conventional systems of the same kind used up to now:

an extreme structural simplicity an absolute operation reliability capability of operating the release of the control bars in an automatic and autonomous way as a function solely of the reaching of a predetermined absolute value of the temperature of the cooling fluid elimination of the presence of external sources of energy or power supply;

capability of performing the release (scram) by means of a force or of a torque developed autonomously at the interior of the actuator for the sole effect of the increase of the absolute temperature of the cooling fluid;

mechanical continuity of its internal components and consequently with the exclusion of electrical or electronic interfaces of any kind, so that between the thermal sensor which produces a force and the mechanical members for the release of the control bars there are only rigid mechanical structures integrally coupled to each other.

Finally, it should be remarked that the mechanism according to the present invention, besides its particular application in the nuclear field, may find other advantageous applications, with suitable modifications, in the industrial field generally considered; for instance, for realizing safety valves to be placed side to side with respect to the conventional safety valves with spring threshold, with a particular reference to the field of the chemical-thermal industry.

The threshold valves up to now prescribed by the control authorities are actuated by the internal pressure of the vessels to be protected. The valves that may be introduced with the thermal sensor according to the present invention will be, on the contrary, actuated by the temperature at the interior to the vessel to be protected. In this sense the new valves cooperate with the existing ones increasing the possibility of choice by the control authorities or by the designers of thermal chemical plants.

The present invention is not limited to the described example of embodiment, but encompasses any modification of the same.

We claim:

1. In a pressurized water cooled nuclear reactor having a reactor core and control bars for insertion into said reactor core, said reactor core comprising a plurality of fuel elements, means for supporting said control bars in a bundle, a mechanism for suspending said bundle of control bars in a spaced position above said fuel elements and for effecting an automatic release of said bundle of control bars, said mechanism comprising:

a thermal sensor generating a mechanical force as a function of the absolute temperature of water contacting said fuel elements in the reactor, said thermal sensor being installed inside one of said fuel elements in contact with water cooling said reactor, said thermal sensor comprising a first bar and a second bar, each of said bars extending from a lowermost position inside said one of said fuel elements to a position above said one of said fuel elements, a connection member fixed only to lower ends of said first and second bars maintaining said bars in a parallel spaced relationship throughout the length of said bars, said first bar having a different coefficient of thermal expansion than said second bar so that following an increase in temperature a relative elongation of one of said bars with respect to the other of said bars is produced, holding device means rotatably connected to a rigid structure of said reactor for releasably engaging said means supporting said control bars in a suspended and spaced position above said fuel elements of said reactor when said reactor is in a normal operating condition, mechanical actuator means for disengaging said holding device means from said means supporting said control bars to cause their fall under the force of gravity, an upper end of said first bar being rotatably connected to said mechanical actuator means, an upper end of said second bar being fixedly connected to a rigid structure of said reactor, wherein elongation of one of said bars when the temperature of said water cooling said reactor reaches a predetermined value actuates said mechanical actuator means to release said holding device means.

2. A mechanism according to claim 1, wherein said mechanical actuator means comprises a hinged lever, one end of which is pivoted on the upper end of one of said bars of said thermal sensor, while the other end is pivoted in an intermediate position on said holding device means.

3. A mechanism according to claim 1, wherein transmission means are provided for transmitting to said mechanical actuator means said mechanical force generated by said thermal sensor.

4. A mechanism according to claim 3, wherein said transmission means comprise a first and a second rod, the lower ends of which are fastened to the respective upper ends of said first and second bars of said thermal sensor, the upper end of said second rod being fastened to a rigid structure of said reactor while the upper end of said first rod operate said actuator following the displacement caused by the relative elongation between said first and second bar of said thermal sensor when a temperature change occurs.

* * * * *